(12) United States Patent
Ji et al.

(10) Patent No.: US 10,764,416 B2
(45) Date of Patent: Sep. 1, 2020

(54) CASING ASSEMBLY AND TERMINAL

(71) Applicant: GUANGDONG OPPO MOBILE TELECOMMUNICATIONS CORP., LTD., Dongguan, Guangdong (CN)

(72) Inventors: Bin Ji, Guangdong (CN); Mengshuai Liu, Guangdong (CN); Zimei Yang, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 16/583,216

(22) Filed: Sep. 25, 2019

(65) Prior Publication Data

US 2020/0195765 A1 Jun. 18, 2020

(30) Foreign Application Priority Data

Dec. 14, 2018 (CN) .................. 2018 2 2110131 U (51) Int. Cl.
*H04M 1/02* (2006.01)
*G06F 1/16* (2006.01)

(52) U.S. Cl.
CPC ........ *H04M 1/0283* (2013.01); *G06F 1/1656* (2013.01); *H04M 1/0274* (2013.01)

(58) Field of Classification Search
CPC ........................... H04B 1/3888; H04M 1/0283
See application file for complete search history.

(56) References Cited

U.S. PATENT DOCUMENTS

| | | | | |
|---|---|---|---|---|
| 2005/0002520 A1* | 1/2005 | Sun | ..................... | H04M 1/0283 379/447 |
| 2011/0120901 A1* | 5/2011 | Liu | ..................... | H04M 1/0283 206/524.6 |
| 2011/0228455 A1* | 9/2011 | Dong | ..................... | H04M 1/05 361/679.01 |
| 2015/0111623 A1 | 4/2015 | Hegemier et al. | | |
| 2017/0124370 A1* | 5/2017 | He | ..................... | G06K 9/0012 |

FOREIGN PATENT DOCUMENTS

| | | |
|---|---|---|
| CN | 104618632 | 5/2015 |
| CN | 105187584 | 12/2015 |
| CN | 205356418 | 6/2016 |
| CN | 107608453 | 1/2018 |
| CN | 107659684 | 2/2018 |
| CN | 108040445 | 5/2018 |
| JP | 2004139558 | 5/2004 |
| JP | 2006066963 | 3/2006 |
| WO | 03039111 | 5/2003 |

OTHER PUBLICATIONS

EPO, Office Action for EP Application No. 19198909.4, dated Oct. 29, 2019.
WIPO, English translation of the ISR and WO for PCT/CN2019/107563, dated Dec. 20, 2019.

* cited by examiner

*Primary Examiner* — Hsinchun Liao
(74) *Attorney, Agent, or Firm* — Hodgson Russ LLP (57) ABSTRACT

The present disclosure relates to a casing assembly and a terminal. The casing assembly includes a rear casing and a decorative member. The rear casing has a front surface and a rear surface opposite the front surface. The rear casing defines a mounting hole extending through the front surface and the rear surface. The decorative member is disposed in the mounting hole and coupled to the rear casing. The decorative member covers the mounting hole and extends out of the rear surface.

18 Claims, 6 Drawing Sheets

CASING ASSEMBLY AND TERMINAL

CROSS-REFERENCE TO RELATED APPLICATION(S)

This application claims priority to Chinese Patent Application No. 201822110131.1, filed on Dec. 14, 2018, the entire disclosure of which is incorporated herein by reference.

TECHNICAL FIELD

The present disclosure relates to the technical field of terminals, and in particular, to a casing assembly and a terminal.

BACKGROUND

Terminals such as smart phones are generally provided with a rear casing. An appearance of the rear casing may represent an overall appearance of the terminal. Since the rear casing has a large surface area, when in contact with an external object, the rear casing may be easily subject to scratch and abrasion.

SUMMARY

According to a first aspect of the present disclosure, a casing assembly is provided.

The casing assembly includes a rear casing and a decorative member. The rear casing has a front surface and a rear surface opposite the front surface. The rear casing defines a mounting hole extending through the front surface and the rear surface. The decorative member is disposed in the mounting hole and coupled to the rear casing. The decorative member covers the mounting hole and extends out of the rear surface.

According to a second aspect of the present disclosure, a terminal is provided.

The terminal includes a casing assembly. The casing assembly includes a rear casing and a decorative member. The rear casing has a front surface and a rear surface opposite the front surface. The rear casing defines a mounting hole extending through the front surface and the rear surface. The decorative member is disposed in the mounting hole and coupled to the rear casing. The decorative member covers the mounting hole and extends out of the rear surface. According to a third aspect of the present disclosure, a terminal is provided. The terminal includes a rear casing and a decorative member. The rear casing has a rear surface exposed to an outside of the terminal. The decorative member is disposed in the rear casing and includes a part extending out of the rear surface of the rear casing.

BRIEF DESCRIPTION OF THE DRAWINGS

To describe technical solutions in implementations of the present disclosure or the related art more clearly, the following will briefly introduce the accompanying drawings required for the description of the implementations or the related art. Obviously, the accompanying drawings described below only show some implementations of the present disclosure, and those skilled in the art can obtain other drawings based on these drawings without paying creative efforts.

DETAILED DESCRIPTION

To facilitate understanding of the present disclosure, the present disclosure will be described more fully hereinafter with reference to the accompanying drawings. Implementations of the present disclosure are given in the accompanying drawings. However, the present disclosure can be implemented in many different forms and is not limited to the implementations described herein. Rather, these implementations are provided for more thorough understanding of the present disclosure.

"Terminal device" used herein includes, but is not limited to, a device configured to be coupled with other devices via any one or more of the connection modes described in the following and configured to receive and/or transmit communication signals. The connection modes include: (1) coupling via wired circuit connection such as a public switched telephone network (PSTN), a digital subscriber line (DSL), a digital cable, or direct cable connection; (2) coupling via a wireless interface such as a cellular network, a wireless local area network (WLAN), a digital television network such as a digital video broadcasting-H (DVB-H) network, a satellite network, or an amplitude modulation-frequency modulation (AM-FM) broad transmitter.

The terminal device configured to communicate via the wireless interface may be referred to as a "terminal". The terminal includes but is not limited to an electronic device described in the following: (1) a satellite phone or a cellular phone; (2) a personal communication system (PCS) terminal capable of combining with a cellular wireless phone, data processing, faxing, and data communication capabilities; (3) a radio phone, a pager, an internet/intranet access, a Web browser, a memo pad, a calendar, and a personal digital assistant (PDA) equipped with a global position system (GPS) receiver; (4) a conventional laptop and/or palmtop receiver; (5) a conventional laptop and/or palmtop radio phone transceiver and the like.

Figure 1:
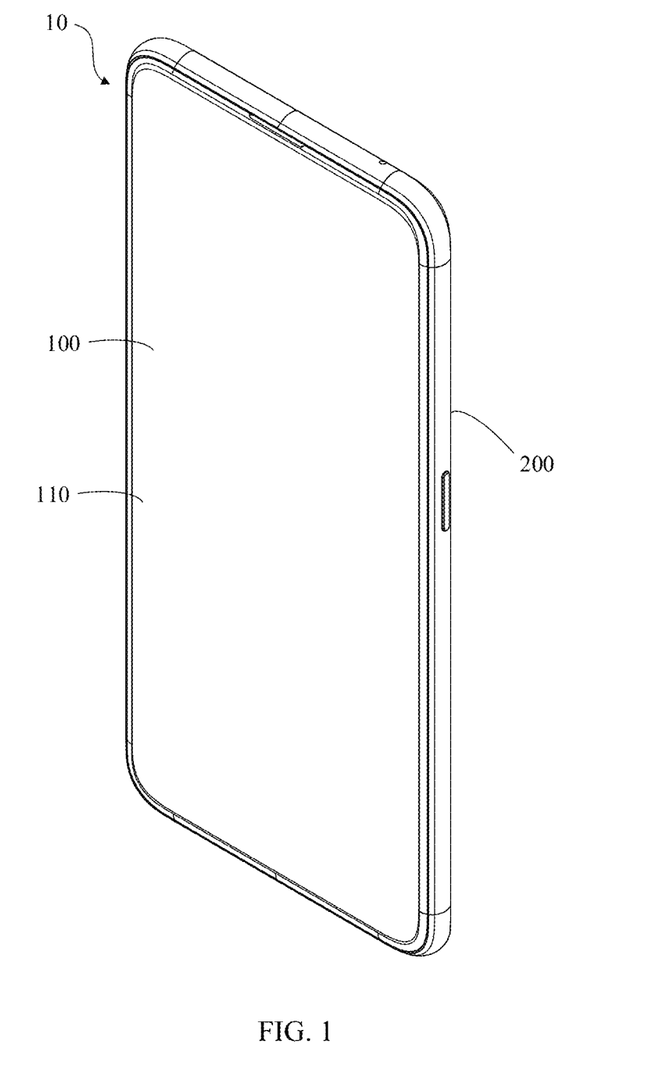
FIG. 1 is a perspective view of a terminal according to an implementation of the present disclosure.

Referring to FIG. 1, in an implementation, the terminal 10 is a smart phone. The terminal 10 includes a terminal device 100 and a casing assembly 200. The casing assembly 200 is coupled to the terminal device 100. The terminal device 100 may include a display screen 110 and a camera module (not illustrated). The display screen 110 can be configured to display information and provide an interactive interface for a user. The camera module can be configured to take photos or videos, or configured to make a video call. The casing assembly 200 is disposed at a side of the display screen 110 facing away from a display area of the display screen 110. A mounting space is defined between the display screen 110 and the casing assembly 200 for mounting of a battery, a circuit board 120 (referring to FIG. 5), and other electronic components of the terminal 10. The terminal 10 may include a processor, a baseband chip, a memory chip, a power management module, and the like that are integrated on the circuit board 120. The casing assembly 200 covers the circuit board 120, the battery, and the camera module of the terminal device 100 to protect the electronic components of the terminal device 100. In addition, the casing assembly 200 can be further used for decoration to beautify the terminal 10. In other implementations, the terminal 10 may be a tablet computer or the like.

Figure 2:
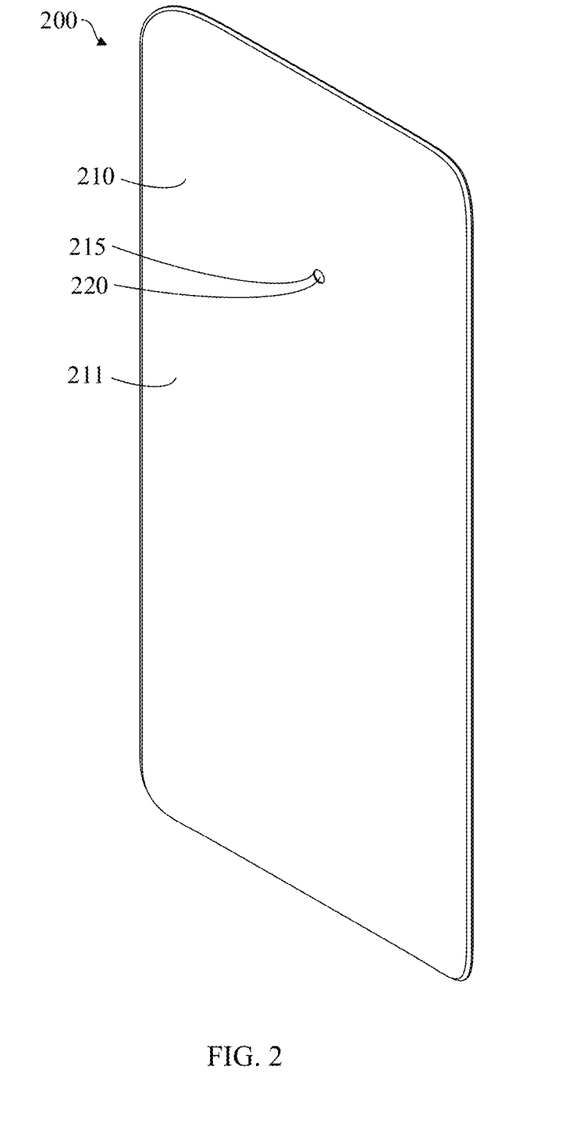
FIG. 2 is a perspective view of a rear casing of the terminal illustrated in FIG. 1 according to an implementation of the present disclosure.
Figure 3:
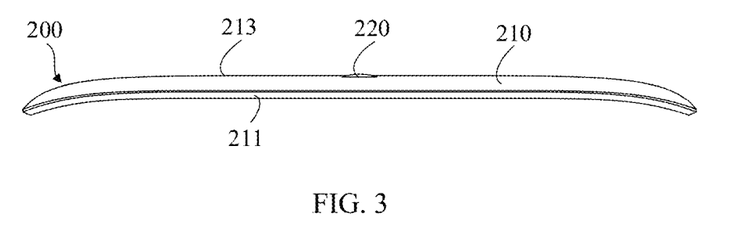
FIG. 3 is a bottom view of the rear casing of the terminal illustrated in FIG. 2.

Referring to FIG. 2 and FIG. 3, the casing assembly 200 includes a rear casing 210 and a decorative member 220. The rear casing 210 is substantially rectangular. The rear casing 210 has a front surface 211 and a rear surface 213 opposite the front surface 211. The rear casing 210 defines a mounting hole 215 extending through the front surface 211 and the rear surface 213. When the casing assembly 200 is mounted on the terminal device 100, the rear surface 213 of the rear casing 210 can be directly touched by the user. An appearance of the rear surface 213 is most important for an overall appearance of the terminal 10, that is, the appearance of the rear surface 213 may represent the overall appearance of the terminal 10. The decorative member 220 is disposed in the mounting hole 215 and coupled to the rear casing 210. The decorative member 220 covers the mounting hole 215 and extends out of the rear surface 213. The following will illustrate the decorative member 220 extending out of the rear surface 213. A wall of the mounting hole 215 meets the rear surface 213 to define an intersection line. A geometric plane perpendicular to a thickness direction of the rear casing 210 and tangent to the intersection line is defined as a reference plane. The decorative member 220 has a part disposed at a side of the reference plane facing away from the front surface 211. It can be understood that, in the implementation of the present disclosure, "covering" means that the decorative member 220 can block ambient light. For example, the decorative member 220 with low transmissivity may be adopted. For example, the transmissivity of the decorative member 220 may be less than 80%. The camera module of the terminal device 100 defines a light-transmitting hole. The light-transmitting hole has an orthographic projection on the rear surface 213 of the rear casing 210, where the orthographic projection is outside an orthographic projection of the decorative member 220 on the rear surface 213 of the rear casing 210. That is, light reception of the camera module is not affected by the decorative member 220.

Figure 4:
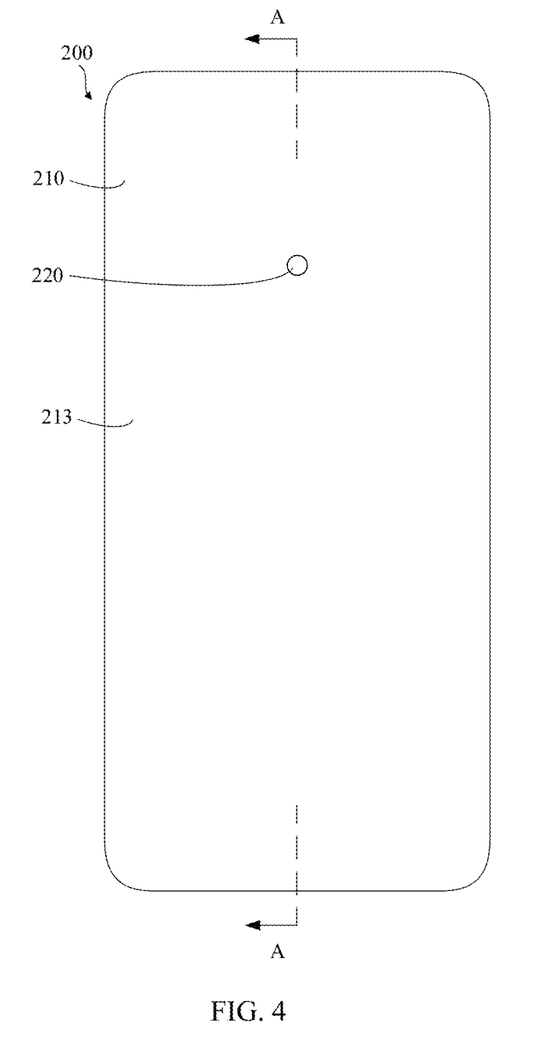
FIG. 4 is a front view of the rear casing of the terminal illustrated in FIG. 2.
Figure 5:
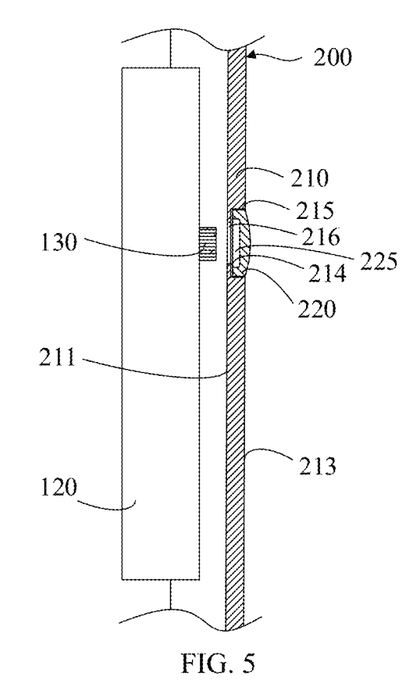
FIG. 5 is a cross-sectional view of the rear casing of the terminal illustrated in FIG. 4 according to an implementation of the present disclosure, taken along a line A-A.

Referring to FIG. 4 and FIG. 5, in an implementation, the decorative member 220 is substantially cylindrical. The mounting hole 215 includes a first hole 214 and a second hole 216 communicating with the first hole 214. The first hole 214 and the second hole 216 are circular. The first hole 214 has a maximum width larger than a maximum width of the second hole 216. The first hole 214 has a wall coupled to the rear surface 213. The second hole 216 has a wall coupled to the front surface 211. By means of the above structure, the mounting hole 215 is a counterbore. The decorative member 220 passes through the first hole 214 and is coupled to a bottom wall of the first hole 214, that is, the decorative member 220 can be disposed in the first hole 214 from the rear surface 213. By means of the counterbore structure, a movement of the decorative member 220 is limited. Further, the decorative member 220 can be fixedly coupled to the rear casing 210 via adhesive or double-sided tape, thereby realizing a reliable connection between the decorative member 220 and the rear casing 210.

Figure 6:
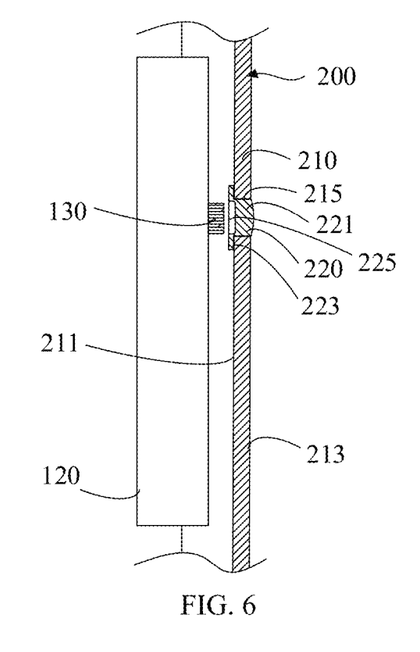
FIG. 6 is a cross-sectional view of the rear casing of the terminal illustrated in FIG. 4 according to another implementation of the present disclosure, taken along the line A-A.

Referring to FIG. 6, in another implementation, the decorative member 220 includes a main body 221 and a lug 223, where the main body 221 and the lug 223 are integrally formed. The main body 221 and the lug 223 are cylindrical. The lug 223 protrudes from an outer periphery of the main body 221. The main body 221 passes through the mounting hole 215, and the lug 223 is disposed against the front surface 211. Double-sided tape or a glue layer may be provided between the lug 223 and the front surface 211 of the rear casing 210 to realize a fixed connection between the decorative member 220 and the rear casing 210. By means of the above structure, the decorative member 220 can be disposed in the mounting hole 215 from the front surface 211 of the rear casing 210, thereby facilitating the assembly of the decorative member 220 and the rear casing 210.

In yet another implementation, the decorative member 220 includes the main body 221 and the lug 223, where the main body 221 and the lug 223 are integrally formed. The main body 221 and the lug 223 are cylindrical. The lug 223 protrudes from an outer periphery of the main body 221. The main body 221 passes through the mounting hole 215 and is coupled to the rear casing 210. The lug 223 is disposed against the rear surface 213. In addition, double-sided tape or a glue layer may be provided between the lug 223 and the rear surface 213 of the rear casing 210 to realize the fixed connection between the decorative member 220 and the rear casing 210. By means of the above structure, the decorative member 220 can be placed in the mounting hole 215 from the rear surface 213 of the rear casing 210, thereby facilitating the assembly of the decorative member 220 and the rear casing 210.

In an implementation illustrated in FIG. 5, a cross section of the decorative member 220 is circular. In other examples, the cross section of the decorative member 220 may also be rectangular, triangular, pentagon, hexagonal, heart-shaped, or the like. The mounting hole 215 may has a cross-section in rectangular shape, triangular shape, pentagon shape, hexagonal shape, heart shape, or the like. By designing shapes of the mounting hole 215 and the decorative member 220, various decorative effects can be realized by a combination of the mounting hole 215 and the decorative member 220, thereby beautifying the terminal 10. In an example, a part of the decorative member 220 extending out of the rear surface 213 is rounded, so that an exposed end of the decorative member 220 is spherical, thereby providing a decorative effect that is rounded in visual.

In an implementation, the decorative member 220 is transparent and has a certain transmissivity. For example, the transmissivity of the decorative member 220 may be greater than 60%. The decorative member 220 may be made of a material selected from a group consisted of glass, ceramic, and plastic. The decorative member 220 may be colorless and transparent, or may be colored. For example, the decorative member 220 may be light green, light yellow, light red, or the like. A side of the decorative member 220 facing away from the rear surface 213 may be provided with a fluorescent layer capable of fluorescing. The combination of the fluorescent layer and the decorative member 220 can provide a good decorative effect for the terminal 10. In another implementation, the side of the decorative member 220 facing away from the rear surface 213 may be provided with a photochromic layer, where the photochromic layer can present a reversible color change under illumination of ambient light, thereby providing a good decorative effect for the rear casing 210 of the terminal 10. The side of the decorative member 220 facing away from the rear surface 213 may be further provided with a logo. For example, the logo can be set via the fluorescent layer or the photochromic layer, and details are not repeated herein. In examples where the decorative member 220 is transparent, light reaching the decorative member 220 may be refracted or reflected to make the logo be three-dimensional in visual.

Referring to FIG. 5 and FIG. 6, the side of the decorative member 220 facing away from the rear surface 213 may define a recess 225 to reduce material for manufacturing the decorative member 220. The fluorescent layer, the photochromic layer, or the like may be formed in the recess 225 to reduce an overall thickness of the decorative member 220. The terminal device 100 may include a circuit board 120 and a light source 130 that face away from the rear surface 213. The light source 130 may be electrically coupled to the circuit board 120. The light source 130 may be a light emitting diode (LED) light. The light source 130 can emit light when powered, and the light emitted by the light source 130 can reach the decorative member 220 to enable the decorative member 220 to provide enhanced decoration. The color of the light emitted by the light source 130 and the color of the decorative member 220 can be combined to provide good decoration. For example, when the decorative member 220 is light green, the light emitted by the light source 130 may be white, so that good decoration can be provided via the decorative member 220. For example, in an example where the side of the decorative member 220 facing away from the rear surface 213 is provided with the fluorescent layer, the light source 130 can enable the fluorescent layer to fluoresce. In addition, the side of the decorative member 220 facing away from the rear surface 213 can be further provided with a light guide film. Light reaching the light guide film are evenly distributed in the light guide film to enable the decorative member 220 to provide good decoration effect, thereby further beautifying the terminal 10. The light guide film can be disposed in the recess 225 to reduce the overall thickness of the decorative member 220.

With respect to the casing assembly 200, since the decorative member 220 extends out of the rear surface 213 of the rear casing 210, when the terminal 10 is placed on a support such as a desktop with the rear surface 213 of the casing assembly 200 facing the support, an area of part of the rear surface 213 of the rear casing 210 in contact with the support is reduced, so that a probability of scratch and abrasion of the rear casing 210 is reduced. In the implementation illustrated in FIG. 4, there is one decorative member 220. In other examples, there may be two or more decorative members 220. For example, there may be four decorative members 220, and the four decorative members 220 can be disposed at four corners of the rear casing 210, so that the rear casing 210 is prevented from abrasion via the four decorative members 220.

Figure 7:
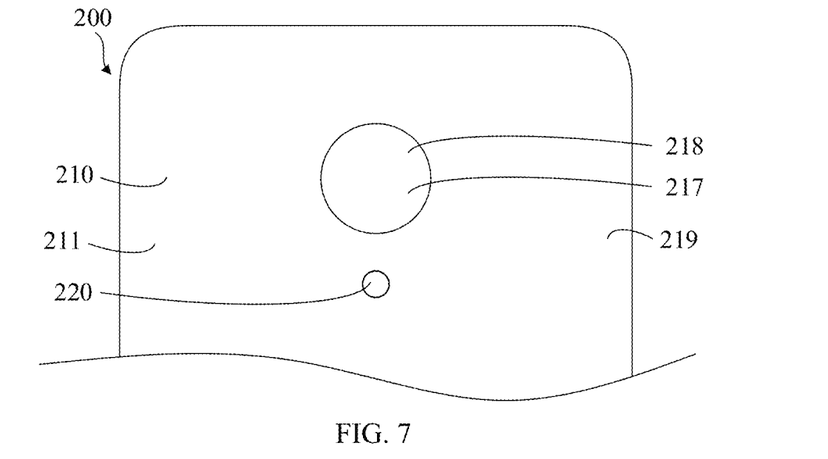
FIG. 7 is a rear view of the rear casing of the terminal illustrated in FIG. 1 according to another implementation of the present disclosure.
Figure 8:
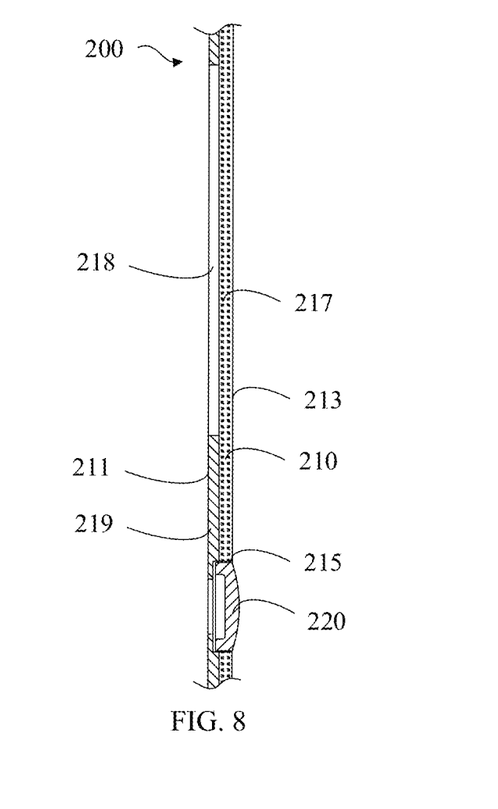
FIG. 8 is a cross-sectional view of the rear casing of the terminal illustrated in FIG. 7.

Referring to FIG. 7 and FIG. 8, in an implementation, the rear casing 210 includes an outer layer 217 and an inner layer 219 coupled to the outer layer 217. The rear surface 213 is on the outer layer 217. The front surface 211 is on the inner layer 219. The inner layer 219 may be made of metal such as aluminum alloy, magnesium alloy, stainless steel, or the like. The inner layer 219 may be made of nonmetal such as plastic, ceramic, or the like. The outer layer 217 may be made of glass, or made of material with high transmissivity such as plastic, optical coating, or the like. The outer layer 217 is transparent, and transmissivity of the outer layer 217 may be greater than 90%. The inner layer 219 defines a light-transmitting hole 218. Ambient light can pass through the outer layer 217 from the rear surface 213 and exits from the front surface 211 via the light-transmitting hole 218. The outer layer 217 has abrasion, thereby preventing the inner layer 219 from abrasion. The inner layer 219 may be made of material with high rigidity, so that the rear casing 210 is of high rigidity. After the casing assembly 200 and the terminal device 100 are assembled together, the camera module is disposed at a side of the rear casing 210 facing away from the rear surface 213. Ambient light passes through the outer layer 217 from the rear surface 213 and reaches the camera module via the light-transmitting hole 218. With respect to the terminal 10, the decorative member 220 can be made small to occupy small part of the rear surface 213 of the rear casing 210, so that the rear surface 213 of the rear casing 210 may have good appearance integrity, and accordingly the terminal 10 may have good appearance integrity. It can be understood that the inner layer 219 can be absent from the rear casing 210.

Figure 9:
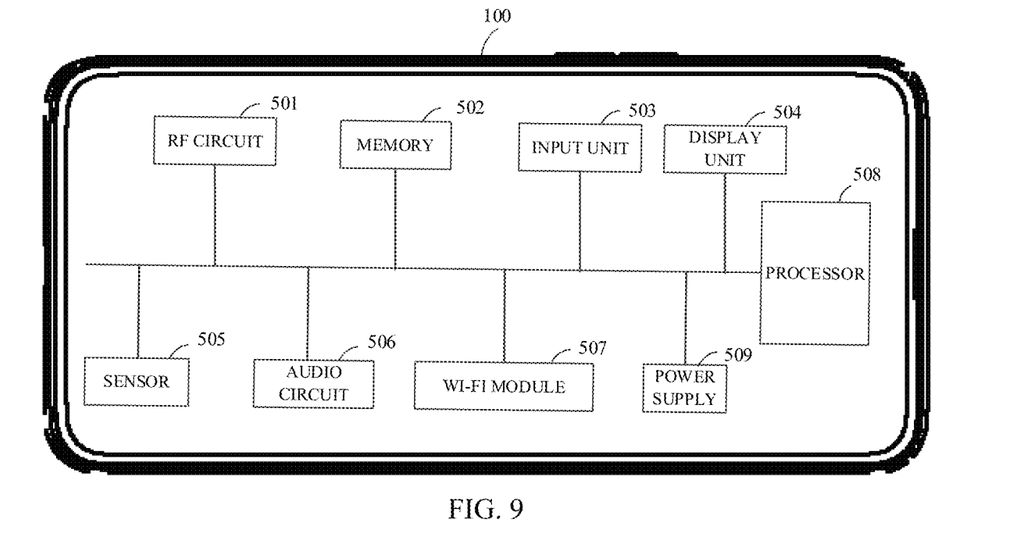
FIG. 9 is a schematic structural diagram illustrating a terminal device according to an implementation of the present disclosure.

Referring to FIG. 9, FIG. 9 is a schematic structural diagram illustrating the terminal device 100 according to an implementation of the present disclosure. The terminal device 100 may include a radio frequency (RF) circuit 501, a memory 502 including one or more computer readable storage medium, an input unit 503, a display unit 504, a sensor 505, an audio circuit 506, a wireless fidelity (Wi-Fi) module 507, a processor 508 including one or more processing cores, a power supply 509, and other components. Those skilled in the art may understand that the structure of the terminal device 100 illustrated in FIG. 9 does not constitute a limitation on the terminal device 100. The terminal device 100 may include more or fewer components than illustrated, combinations of some components, or different component arrangements.

The radio frequency circuit 501 may be configured to receive and transmit information, or to receive and transmit signals during a call. Particularly, the radio frequency circuit 501 is configured to receive downlink information from a base station, then deliver the downlink information to the processor 508 for processing, and transmit uplink data to the base station. Generally, the radio frequency circuit 501 includes, but is not limited to, an antenna, at least one amplifier, a tuner, one or more oscillators, a subscriber identity module (SIM) card, a transceiver, a coupler, a low noise amplifier (LNA), a duplexer, and the like. In addition, the radio frequency circuit 501 is also configured to communicate with a network and other devices via wireless communication. The wireless communication may use any communication standard or protocol, which includes, but is not limited to, global system for mobile communication (GSM), general packet radio service (GPRS), code division multiple access (CDMA), wideband code division multiple access (WCDMA), long term evolution (LTE), e-mail, short messaging service (SMS), and the like.

The memory 502 may be configured to store application programs and data. The application programs stored in the memory 502 may include executable codes. The application programs may be used to form various functional modules. The processor 508 is configured to run the application programs stored in the memory 502 to implement various functional applications and data processing. The memory 502 may mainly include a program storage area and a data storage area. The program storage area may store an operating system, an application program required by at least one function (such as a sound playback function and an image display function), and the like. The data storage area may store data (such as audio data and an address book, etc.) created according to use of the terminal device 100, and the like. In addition, the memory 502 may include a high speed random access memory, and may also include a non-volatile memory such as at least one magnetic disk storage device, a flash memory, or other volatile solid-state storage devices. Accordingly, the memory 502 may also include a memory controller to provide accesses to the memory 502 for the processor 508 and the input unit 503.

The input unit 503 may be configured to receive input digit or character information or user feature information (such as a fingerprint), and to generate an input of a keyboard, a mouse, a joystick, an optical or trackball signal related to user setting and function control. In an implementation, the input unit 503 may include a touch-sensitive panel and other input devices. The touch-sensitive panel, which may also be referred to as a touch screen or touchpad, may collect a touch operation of a user on or near the touch-sensitive panel (such as an operation of a user on or near the touch-sensitive panel with any suitable object or accessory, such as a finger or a stylus), and drive a corresponding connection apparatus according to a preset program. Optionally, the touch-sensitive panel may include two parts: a touch detection apparatus and a touch controller. The touch detection apparatus is configured to detect a touch position of the user, and to detect a signal generated upon the touch operation and transfer the signal to the touch controller. The touch controller is configured to receive the touch information from the touch detection apparatus, to convert the touch information into coordinates of a touch point, and to transmit the coordinates of the touch point to the processor 508. Moreover, the touch controller is configured to receive and execute a command transmitted by the processor 508.

The display unit 504 may be configured to display information input by the user or information provided for the user, and various graphic user interfaces of the terminal device 100. The graphic user interfaces may include a graph, a text, an icon, a video, and any combination thereof. The display unit 504 may include a display panel. For example, the display panel may be configured as a liquid crystal display (LCD), an organic light-emitting diode (OLED), or the like. Further, the touch-sensitive panel may cover the display panel. After detecting a touch operation on or near the touch-sensitive panel, the touch-sensitive panel transfers the touch operation to the processor 508 to determine a type of a touch event, and the processor 508 then provides a corresponding visual output on the display panel based on the type of the touch event determined. Although in FIG. 9 the touch-sensitive surface and the display panel are two separate components for realizing input and output, in some implementations, the touch-sensitive surface can be integrated with the display panel to achieve input and output functions. It can be understood that the display screen 110 may include the input unit 503 and the display unit 504.

The terminal device 100 may further include at least one sensor 505, such as an optical sensor, a motion sensor, and other sensors. In an example, the optical sensor may include an ambient light sensor and a proximity sensor. The ambient light sensor can sense brightness of the ambient light to adjust luminance of the display panel. When the proximity sensor senses that the terminal device is moved to an ear, the display panel and/or backlight is switched off. As a type of motion sensor, an acceleration sensor may be enumerated. The acceleration sensor can detect magnitude of accelerations in various directions (generally on three axes), may detect a magnitude and direction of the gravity when the terminal device 100 is stationary. The accelerometer sensor can be used for mobile phone-gesture recognition-related applications (such as vertical-horizontal screen switch, related games, magnetometer attitude calibration), or for vibration-recognition related functions (such as a pedometer, percussion), and the like. The terminal device 100 may also include other sensors, such as a gyro-sensor, an air pressure detector, a humidity detector, a temperature detector, and an infrared sensor, and details are not repeated herein.

The audio circuit 506 may provide audio interfaces between the user and the terminal device 100 via a loudspeaker and a microphone. The audio circuit 506 is configured to convert received audio data into an electric signal and transmit the electric signal to the loudspeaker. The loudspeaker is configured to convert the electric signal into a sound signal for output. On the other hand, the microphone is configured to convert a collected sound signal into an electric signal. The audio circuit 506 is configured to receive the electric signal and convert the electric signal into audio data, and to output the audio data to the processor 508 for processing. Then, the processor 508 is configured to transmit the audio data to, for example, another terminal device 100 via the radio frequency circuit 501, or to output the audio data to the memory 502 for further processing. The audio circuit 506 may also include a headset jack to provide a communication between a headset and the terminal device 100.

Wi-Fi is a type of short distance wireless transmission technology. The terminal device 100 may help, via the Wi-Fi module 507, the user to receive and send e-mails, browse a webpage, access streaming media, and so on, which provides wireless broadband internet access for the user. Although the Wi-Fi module 507 is illustrated in FIG. 9, it could be understood that the Wi-Fi module 507 is not an essential component of the terminal device 100, and when required, the Wi-Fi module 507 may be omitted as long as the scope of the essence of the present disclosure is not changed.

The processor 508 is a control center of the terminal device 100, and is coupled with various parts of the terminal device 100 via various interfaces and lines. By running or executing the application programs stored in the memory 502, and invoking data stored in the memory 502, the processor 508 can perform various functions and data processing of the terminal device 100, thereby performing overall monitoring on the terminal device 100. Optionally, the processor 508 may include one or more processing cores. For example, the processor 508 may be integrated with an application processor and a modem processor. The application processor is mainly configured to process an operating system, a user interface, an application program, and the like. The modem is mainly configured to process wireless communication. It may be understood that the modem processor may also not be integrated in the processor 508.

The terminal device 100 further includes the power supply 509 for supplying power to the components. For example, the power supply 509 may be logically coupled with the processor 508 via a power management system, thereby implementing functions such as charging, discharging, and power consumption management via the power management system. The power supply 509 may also include one or more a direct-current power or alternating-current power, a rechargeable system, a power fault detecting circuit, a power converter or inverter, power status indicator, and other components.

Although not illustrated in FIG. 9, the terminal device 100 may further include a Bluetooth module and the like, and details are described herein. For specific implementations, the foregoing modules may be implemented as a separate entity, or may be implemented in any combination, and may be implemented as a same or multiple entities. For specific implementations of the foregoing modules, reference can be made to the foregoing method implementations, and details are not further described herein.

The technical features of the above-mentioned implementations can be arbitrarily combined. In order to make the description brief, not all possible combinations of the respective technical features in the above-mentioned implementations are illustrated. As long as there is no contradiction in the combination of these technical features, the combination should be considered within the scope of present disclosure.

Although explanatory implementations have been shown and described, it would be appreciated by those skilled in the art that the above implementations cannot be construed to limit the present disclosure, and changes, alternatives, and modifications can be made in the implementations without departing from spirit, principles and scope of the present disclosure. Therefore, the scope of the present disclosure should be subject to the appended claims.

What is claimed is:

1. A casing assembly, comprising:
a rear casing, having a front surface and a rear surface opposite the front surface, the rear casing defining a mounting hole extending through the front surface and the rear surface; and
a decorative member, disposed in the mounting hole and coupled to the rear casing, the decorative member covering the mounting hole and extending out of the rear surface;
wherein:
the mounting hole comprises a first hole and a second hole communicating with the first hole, wherein the first hole has a maximum width larger than a maximum width of the second hole, the first hole has a wall coupled to the rear surface, and the second hole has a wall coupled to the front surface; and
the decorative member passes through the first hole and is coupled to a bottom wall of the first hole.

2. The casing assembly of claim 1, wherein:
the decorative member comprises a main body and a lug, wherein the main body and the lug are integrally formed, the lug protrudes from an outer periphery of the main body, the main body passes through the mounting hole, and the lug is disposed against the front surface.

3. The casing assembly of claim 1, wherein:
the decorative member comprises a main body and a lug, wherein the main body and the lug are integrally formed, the lug protrudes from an outer periphery of the main body, the main body passes through the mounting hole and is coupled to the rear casing, and the lug is disposed against the rear surface.

4. The casing assembly of claim 1, wherein a side of the decorative member facing away from the rear surface is provided with a layer selected from a group consisted of a fluorescent layer, a photochromic layer, or a light guide film.

5. The casing assembly of claim 4, wherein:
the side of the decorative member facing away from the rear surface defines a recess; and
the layer is formed in the recess.

6. The casing assembly claim 1, wherein:
the rear casing comprises an outer layer and an inner layer coupled to the outer layer;
the rear surface is on the outer layer;
the front surface is on the inner layer;
the outer layer is transparent;
the inner layer defines a light-transmitting hole; and
the outer layer enables ambient light to pass through the rear surface and exit from the front surface via the light-transmitting hole.

7. A terminal, comprising:
a casing assembly, comprising:
a rear casing, having a front surface and a rear surface opposite the front surface, the rear casing defining a mounting hole extending through the front surface and the rear surface; and
a decorative member, disposed in the mounting hole and coupled to the rear casing, the decorative member covering the mounting hole and extending out of the rear surface;
wherein a side of the decorative member facing away from the rear surface is provided with a layer selected from a group consisted of a fluorescent layer, a photochromic layer, or a light guide film.

8. The terminal of claim 7, wherein:
the rear casing comprises an outer layer and an inner layer coupled to the outer layer;
the rear surface is on the outer layer;
the front surface is on the inner layer;
the outer layer is transparent;
the inner layer defines a light-transmitting hole;
the terminal comprises a camera module disposed at a side of the rear casing facing away from the rear surface; and
the outer layer enables ambient light to pass through the rear surface and reach the camera module via the light-transmitting hole.

9. The terminal of claim 7, comprising:
a light source facing away from the rear surface and configured to emit light reaching the decorative member.

10. The terminal of claim 7, wherein:
the mounting hole comprises a first hole and a second hole communicating with the first hole, wherein the first hole has a maximum width larger than a maximum width of the second hole, the first hole has a wall coupled to the rear surface, and the second hole has a wall coupled to the front surface; and
the decorative member passes through the first hole and is coupled to a bottom wall of the first hole.

11. The terminal of claim 7, wherein a side of the decorative member facing away from the rear surface defines a recess.

12. The terminal of claim 7, wherein:
the side of the decorative member facing away from the rear surface defines a recess; and
the layer is formed in the recess.

13. The terminal of claim 7, wherein the decorative member is transparent and made of a material selected from a group consisted of glass, ceramic, or plastic.

14. The terminal of claim 7, wherein:
the decorative member comprises a main body and a lug, wherein the main body and the lug are integrally formed, the lug protrudes from an outer periphery of the main body, the main body passes through the mounting hole, and the lug is disposed against the front surface.

15. The terminal of claim 7, wherein:
the decorative member comprises a main body and a lug, wherein the main body and the lug are integrally formed, the lug protrudes from an outer periphery of the main body, the main body passes through the mounting hole and is coupled to the rear casing, and the lug is disposed against the rear surface.

16. A terminal, comprising:
a rear casing, having a front surface and a rear surface opposite the front surface, the rear casing defining a mounting hole extending through the front surface and the rear surface; and
a decorative member, disposed in the mounting hole and coupled to the rear casing, the decorative member covering the mounting hole and extending out of the rear surface;
wherein:
the mounting hole comprises a first hole and a second hole communicating with the first hole, wherein the first hole has a maximum width larger than a maximum width of the second hole, the first hole has a wall coupled to the rear surface, and the second hole has a wall coupled to the front surface; and
the decorative member passes through the first hole and is coupled to a bottom wall of the first hole.

17. The terminal of claim 16, wherein:
the decorative member comprises a main body and a lug, wherein the main body and the lug are integrally formed, the lug protrudes from an outer periphery of the main body, the main body passes through the mounting hole, and the lug is disposed against the front surface of the rear casing.

18. The terminal of claim 16, wherein a side of the decorative member facing away from the rear surface is provided with a layer selected from a group consisted of a fluorescent layer, a photochromic layer, or a light guide film.

* * * * *